US 8,700,757 B2

(12) United States Patent
He et al.

(10) Patent No.: US 8,700,757 B2
(45) Date of Patent: *Apr. 15, 2014

(54) METHOD FOR EXECUTING MANAGEMENT OPERATION BY COMMUNICATION TERMINAL AND A TERMINAL AND SYSTEM THEREOF

(75) Inventors: Jiangshui He, Shijiazhuang (CN); Kepeng Li, Shenzhen (CN); Xiaoqian Chai, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 13/149,302

(22) Filed: May 31, 2011

(65) Prior Publication Data

US 2011/0231538 A1 Sep. 22, 2011

Related U.S. Application Data

(63) Continuation of application No. 12/053,750, filed on Mar. 24, 2008, now Pat. No. 7,953,836, which is a continuation of application No. PCT/CN2007/001371, filed on Apr. 24, 2007.

(30) Foreign Application Priority Data

Aug. 11, 2006 (CN) .......................... 2006 1 0115238

(51) Int. Cl.
*G06F 15/173* (2006.01)

(52) U.S. Cl.
USPC ............ 709/223; 709/224; 709/229; 370/401

(58) Field of Classification Search
USPC ........................................................ 709/223
See application file for complete search history.

(56) References Cited

U.S. PATENT DOCUMENTS

| 7,295,827 B2 * | 11/2007 | Liu et al. .................... 455/343.2 |
| 7,400,642 B2 * | 7/2008 | Koo et al. ..................... 370/447 |
| 2001/0020254 A1 * | 9/2001 | Blumenau et al. ............ 709/229 |
| 2004/0073659 A1 | 4/2004 | Rajsic et al. |
| 2006/0015626 A1 | 1/2006 | Hallamaa et al. |

(Continued)

FOREIGN PATENT DOCUMENTS

| CN | 1531252 A | 9/2004 |
| CN | 1852132 A | 10/2006 |

(Continued)

OTHER PUBLICATIONS

European Patent Office, First Examination Report in European Patent Application No. 07720944.3 (Oct. 12, 2010).

(Continued)

*Primary Examiner* — Hua Fan
(74) *Attorney, Agent, or Firm* — Leydig, Voit & Mayer, Ltd.

(57) ABSTRACT

A method for executing a management operation by a terminal in a communications system. The method comprises the followings: The terminal receives the management operation commands that indicate the operation to target operation nodes in the device capability management object and operates them. The said operation initiates the process for executing the corresponding device capability management operation, then the said management operation transfers the device capability status. Also, the corresponding terminal and system are disclosed. The present invention can centrally manage and control the terminal capability.

6 Claims, 6 Drawing Sheets

(56) References Cited

U.S. PATENT DOCUMENTS

| | | |
|---|---|---|
| 2006/0020947 A1 | 1/2006 | Hallamaa et al. |
| 2008/0059605 A1* | 3/2008 | Shalev et al. ............... 709/217 |
| 2008/0235507 A1 | 9/2008 | Ishikawa et al. |

FOREIGN PATENT DOCUMENTS

| | | |
|---|---|---|
| CN | 101123785 A | 2/2008 |
| EP | 1645962 A1 | 4/2006 |
| EP | 1705827 A1 | 9/2006 |
| JP | 2007-535832 A | 12/2007 |
| JP | 2008-506179 A | 2/2008 |
| JP | 2008-525871 A | 7/2008 |
| WO | WO 2005/006193 A1 | 1/2005 |
| WO | WO 2006/006803 A1 | 1/2006 |
| WO | WO 2006/066277 A2 | 6/2006 |
| WO | WO 2005/086511 A1 | 9/2009 |

OTHER PUBLICATIONS

Korean Intellectual Property Office, First Examination Report in Korean Patent Application No. 10-2008-7008907 (Nov. 23, 2009).
Open Mobile Alliance, "Device Capability Management Object," Work Item Document, pp. 1-2, OMA-WID_0139-DCMO-V1_0-20060606-A.doc) (San Diego, California, 2006).
Open Mobile Alliance, "OMA Device Management Protocol," Candidate Version 1.2, pp. 1-51 (San Diego, California, Apr. 24, 2006).
Open Mobile Alliance, "OMA Device Management Tree and Description," Candidate Version 1.2, pp. 1-48, (San Diego, California, Apr. 24, 2006).
Open Mobile Alliance, "Software Component Management Object," Draft Version 1.0, pp. 1-30 (OMA-TS-DM-SCOMO-V1_0-20060801-D) (San Diego, California, Aug. 1, 2006).
State Intellectual Property Office of the People's Republic of China, Written Opinion of the International Searching Authority in International Patent Application No. PCT/CN2007/001371 (Jul. 26, 2007).
SyncML Initiative, "SyncML Sync Protocol, version 1.0," http://www.openmobilealliance.org/tech/affiliates/syncml/syncml_protocol_v10_20001207.pdf, pp. 1-60 (Dec. 7, 2000).
U.S. Appl. No. 12/053,750 (Nov. 17, 2011).
Written Opinion of the International Searching Authority in corresponding PCT Application No. PCT/CN2007/001371 (Jul. 26, 2007).
Notice of Reasons for Rejection in corresponding Japanese Application No. 2009-523134 (May 31, 2011).
1st Office Action in corresponding Chinese Application No. 200610115238.4 (Jul. 13, 2011).
"OMA Device Management Tree and Description," Jun. 2, 2006, Candidate Version .2, Open Mobile Alliance, Beaverton, Oregon.
Rejection Decision in corresponding Chinese Patent Application No. 200610115238.4 (Mar. 27, 2012).

* cited by examiner

METHOD FOR EXECUTING MANAGEMENT OPERATION BY COMMUNICATION TERMINAL AND A TERMINAL AND SYSTEM THEREOF

CROSS-REFERENCE TO RELATED APPLICATIONS

This application is a continuation of U.S. patent application Ser. No. 12/053,750, filed on Mar. 24, 2008, which is a continuation of International Application No. PCT/CN2007/001371, filed Apr. 24, 2007. The International Application claims priority to Chinese Patent Application No. 200610115238.4, filed on Aug. 11, 2006. The afore-mentioned patent applications are hereby incorporated by reference in their entireties.

FIELD OF THE INVENTION

The present invention relates to communication technology field, and particularly to a method for a terminal to execute a management operation in a communication system, a terminal and a system.

BACKGROUND OF THE INVENTION

With the development of mobile communication technologies, the functions of terminals are increasing and becoming more and more complex, thus bringing difficulties to terminal management.

Open Mobile Alliance Device Management (OMA DM) provides a new management solution, which is mainly used by a third party to manage and set environment and configuration information of a terminal (e.g. mobile terminal and function objects in the terminal) in wireless network, so as to solve problems occurring in using the terminal, to implement software installation and upgrade through the wireless network, and to provide more humanized and individualized services and improve the user's experience. The third party may be a mobile operator, a service provider or the information management department of a partner.

In the management solution of OMA DM, the terminal provides a set of device management trees, and various Management Objects (MOs) are organized on the device management trees.

The management of software components may be implemented by adding, deleting and modifying Software Component Management Objects (SCoMOs) on the terminal. The software components include executable application programs and dynamic link libraries (dlls), etc. The software may be provided by different software providers.

The MOs for existing software components on the terminal are predisposed on the terminal. For example, the Device Management Agent (DMA) can scan all software components installed on the terminal and create related MOs, and then add the MOs to the management tree. The other MOs for software components distributed by the DM server to the terminal are created under instruction of the operation commands sent from the DM server. The other MOs for software components downloaded and installed by the user, a Diagnostic and Monitoring Enabler on the terminal monitors the installation events on the terminal and reports information of the software components to the DM server, and then the DM server sends an operation command to create corresponding MOs.

During the implementation of the present invention, the inventor found that in the above existing DM solution, the operations for software component MOs on the terminal are managed and controlled by the DM server, while the device capabilities on the terminal are operated by the user directly. As information security control is enhanced, in many security zones, it is necessary to disable photography and videography functions of imaging device on terminals. However, it is difficult to supervise all users in the security zone to prevent them from using certain devices on their terminals.

SUMMARY OF THE INVENTION

Embodiments of the present invention provide a method for a terminal to execute a management operation in a communication system, a terminal and a system, so as to manage and control capabilities of the terminal centrally.

An embodiment of the present invention provides a method for a terminal to execute a management operation in a communication system. The method includes: operating, by the terminal, a target operation node in a device capability management object as instructed in a management operation command received by the terminal; and triggering, by the operation for the target operation node, execution of a corresponding device capability management operation, wherein the device capability management operation transits status of a device capability of the terminal.

Another embodiment of the present invention provides a terminal for executing a management operation. The terminal includes a device management agent unit and a device capability management agent unit. The device management agent unit is adapted to operate a target operation node in a device capability management object as instructed in a management operation command received by the device management agent unit. The device capability management agent unit is adapted to execute a device capability management operation corresponding to the operation for the target operation node performed by the device management agent unit, wherein the device capability management operation is adapted to transit status of a device capability of the terminal.

Another embodiment of the present invention provides a communication system for implementing terminal management. The system includes a terminal and a device management server. The device management server is adapted to send a management operation command to the terminal, wherein the management operation command contains instruction information instructing the terminal to operate a target operation node in a device capability management object.

The terminal comprises a device management agent unit and a device capability management agent unit.

The device management agent unit is adapted to operate the target operation node in the device capability management object as instructed in the received management operation command.

The device capability management agent unit is adapted to execute a device capability management operation corresponding to the operation for the target operation node performed by the device management agent unit, wherein the device capability management operation is adapted to transit status of a device capability of the terminal.

It may be seen from the above technical solutions that in the embodiments of the present invention, the terminal can operate a target operation node of the device capability management object (DCMO) according to the received management operation command, the operation for the target operation node triggers execution of a corresponding device capability management operation, and thereby the status of a device capability of the terminal is transited to the status desired by the initiator of the management operation command. In this way, the initiator of the management operation command can manage and control the device capability of the terminal with the management operation command, for example, he/it manages and controls of the status of a device capability of the terminal in a zone where image shooting or resource downloading is forbidden for the security purpose.

DETAILED DESCRIPTION OF THE EMBODIMENTS

Figure 1:
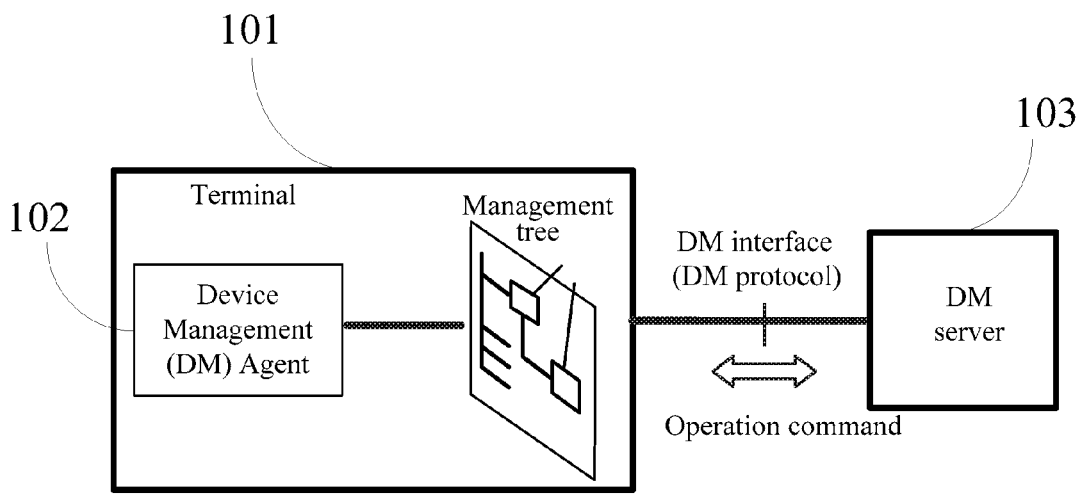
FIG. 1 is a schematic diagram illustrating a system architecture of OMA DM.

FIG. 1 shows a schematic diagram of system architecture of OMA DM. As shown in FIG. 1, a Device Management (DM) server 103 sends an operation command to a terminal 101 via a DM protocol interface. A Device Management Agent (DMA) unit 102 on the terminal 101 is adapted to interpret and execute the command from the DM server. A management tree stored on the terminal 101 serves as an interface for the DM server to manage the terminal via the DM protocol. Device management objects are provided in the management tree, and the DM server controls the management objects on the terminal by operating the management objects on the management tree. The operation commands include Get, Replace, Exec, Copy and Delete, etc.

In a communication system based on DM server, a device management tree on a terminal stores MO nodes including device capability MO, software component MO, firmware update MO, connection parameter MO, scheduling task MO and diagnostic and monitoring MO, etc. Nodes of the device capability MO node correspond to device capability management operations. An operation for a node of the device capability MO on the device management tree triggers execution of a device capability management operation corresponding to the operation for the node. Device capabilities are mainly hardware-related capabilities, and include, but not are limited to USB, Camera, Blue Tooth and Infrared.

Figure 2:
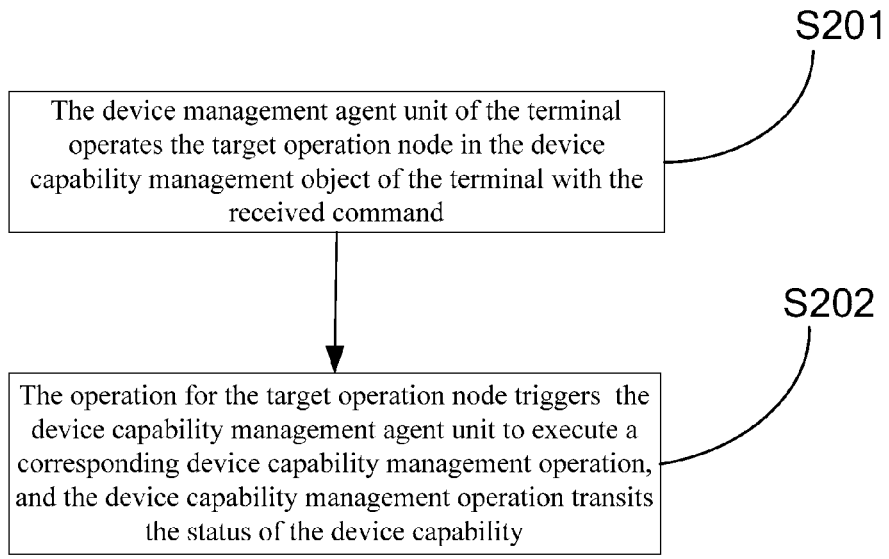
FIG. 2 is a flow chart illustrating an embodiment of a method of the present invention.

Hereunder an embodiment of a method of the present invention will be detailed with reference to the accompanying drawings. Referring to FIG. 2, the embodiment of the method includes the following processes.

In process S201, a device management agent unit on the terminal operates a target operation node in a device capability MO of the terminal according to a management operation command received by the device management agent unit, that is, the terminal operates the target operation node in the device capability MO indicated in the management operation command.

In process S202, the operating of the target operation node triggers a device capability management agent unit of the terminal to execute a corresponding device capability management operation. The device capability management operation transits the status of the device capability.

Figure 3:
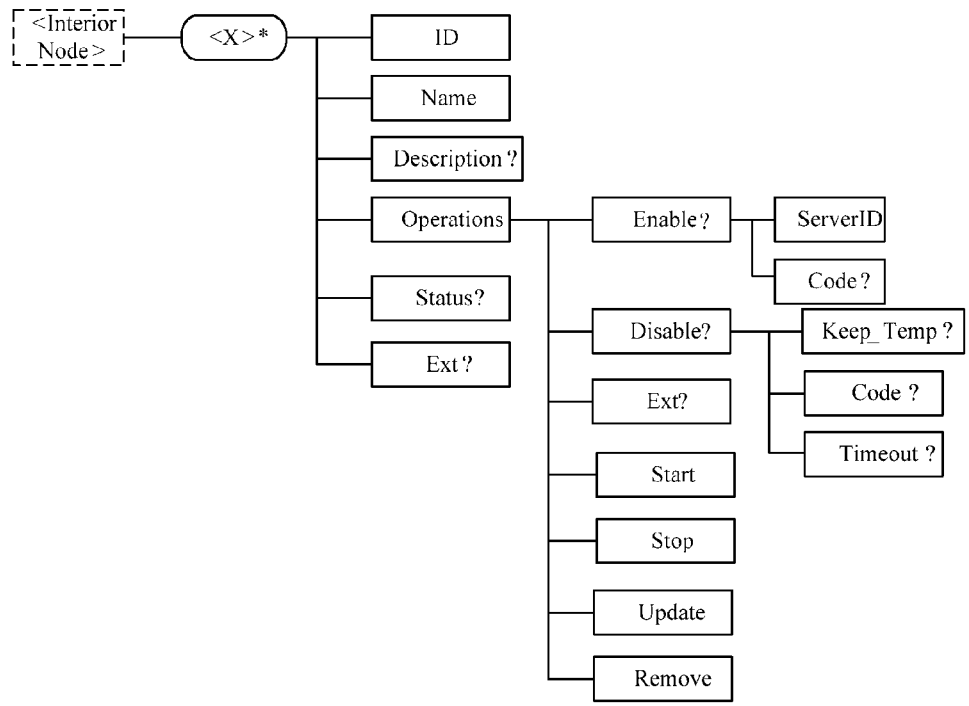
FIG. 3 is a schematic diagram illustrating a first embodiment of the structure of a device capability MO of the present invention.

In the embodiment of the present invention, the corresponding device capability operation is triggered by the operating of the target operation node in the device capability MO. FIG. 3 shows a schematic diagram of a first embodiment of the structure of the device capability MO.

As shown in FIG. 3, the Operations node has child nodes including Enable, Disable, Start, Stop, Update, Remove and commonly used Ext (extend) node. Because the Ext node is a general node, it will not be described here any more. The rest child nodes will be described hereunder in detail.

There are two nodes in the Enable node, that is, a ServerID (server identifier) node and a Code node. The ServerID node stores an identifier of the device management server. The identifier of the device management server is written into the ServerID node by the terminal, and the device management server has only a Read-Only authority, but hasn't a Modify authority to the ServerID node. The Code node is adapted to store an authentication code provided by the user or the device management server initiating the management operation command. If more than one device management servers manage the terminal and one of the device management servers has the highest management authority (stores the authentication code for the terminal), when to enable a relevant device capability of the terminal, any of the rest device management servers or the user needs to send a request to the device management server with the highest management authority to obtain the authentication code and to provide the authentication code to the Enable/Code node.

There are three nodes in the Disable node, that is, a Keep_Temp (Temporarily/Keep) node, a Code node and a Timeout (time interval value) node. The Keep_Temp node is adapted to indicate whether the disabling is forced or temporary, and has a form of indicator. The Disable/Code node is adapted to store an authentication code sent from the device management server that has the highest management authority, and is invisible to the user. When the device capability of the terminal is in Keep Disable status, if the user or any other device management server wants to enable the device capability of the terminal, the user or the device management server needs to send a request to the device management server that has the highest management authority to obtain the authentication code. Then the terminal authenticates validity of the authentication code provided to the Enable/Code node by the user or the any other device management server, according to the authentication code stored in the Disable/Code node. If the authentication code is authenticated as valid, the user or the device management server has the authority to enable the device capability of the terminal; otherwise, the user or the device management server hasn't the Enable authority. The Timeout node stores a time interval value. After being disabled by force (Keep Disable), if the device capability is not enabled within the specified time interval, the terminal enables the device capability automatically, so as to prevent the device capability of the terminal from being disabled by force for long in abnormal cases.

Start, Stop, Update and Remove nodes each serve as an executable node associated with a corresponding device capability operation. The device management server can execute the management operation by means of an Exec command.

Specifically, the Enable, Disable, Start, Stop, Update and Remove nodes may store an operation indicator. Table 1 to table 12 show the attributes of the respective nodes. In the tables, Tree Occurrence refers to the possible times of occurrence of the node in an MO on the management tree, Format refers to the type of the operation indicator including Character and Boolean, etc., and Min. Access Types are the operation types that may be executed by the device management server for the node.

TABLE 1

<X>/Operation/Enable

| Tree Occurrence | Format | Min. Access Types (Minimum Access Types) |
|---|---|---|
| ZeroOrOne | Chr | Get, Exec |

The Enable node is adapted to enable a device capability of the terminal, so as to render the device capability of the terminal to be in Enable status.

TABLE 2

<X>/Operation/Enable/ServerID

| Tree Occurrence | Format | Min. Access Types |
|---|---|---|
| ZeroOrOne | Chr | Get |

The ServerID node stores an identifier of the device management sever. The identifier is written into the ServerID node by the terminal, and the device management server has only a Read-Only authority but hasn't a Modify authority to the Server ID node.

TABLE 3

<X>/Operation/Enable/Code

| Tree Occurrence | Format | Min. Access Types |
|---|---|---|
| ZeroOrOne | Chr | Get, Replace |

The Code node is adapted to store an authentication code provided by the user or the device management server for enabling a device capability of the terminal.

TABLE 4

<X>/Operation/Disable

| Tree Occurrence | Format | Min. Access Types |
|---|---|---|
| ZeroOrOne | Chr | Get, Exec |

The Disable node is adapted to disable the device capability. A device management server with the authority can disable the device capability by executing the Disable node.

TABLE 5

<X>/Operation/Disable/Keep_Temp?

| Tree Occurrence | Format | Min. Access Types |
|---|---|---|
| ZeroOrOne | Chr | Get, Exec |

The disabling of the device capability by the Disable node includes Keep Disable and Temp Disable. By operating the Keep_Temp node, it may be instructed whether to disable the device capability by force or disable the device capability temporarily. Specifically, by modifying the value of the Keep_Temp node, it may be instructed whether the disabling is forced or temporary when executing the Disable node.

TABLE 6

<X>/Operation/Disable/Code?

| Tree Occurrence | Format | Min. Access Types |
|---|---|---|
| ZeroOrOne | Chr | Get, Exec |

The Disable/Code node is adapted to store an authentication code for enabling the device capability. The authentication code is sent from the device management server that has the highest management authority, and is invisible to the user. As described above, to enable the device capability, the authentication code provided by the user needs to be written into the Enable/Code node, and then the terminal authenticates the authentication code in the Enable/Code node according to the authentication code in the Disable/Code node. If the authentication code is authenticated as valid, the Enable operation for the device capability by the terminal is valid; otherwise the Enable operation is invalid.

TABLE 7

<X>/Operation/Disable/Timeout?

| Tree Occurrence | Format | Min. Access Types |
|---|---|---|
| ZeroOrOne | Chr | Get, Exec |

The Timeout node is adapted to store a preset time interval value. If the device capability is not recovered to be in Enable status within the specified time interval, the terminal enables the device capability automatically without the Enable operation by the device management server. That mechanism can prevent the device capability from being disabled for long in abnormal cases.

TABLE 8

<X>/Operation/Start

| Tree Occurrence | Format | Min. Access Types |
|---|---|---|
| ZeroOrOne | Chr | Get, Exec |

The Start node is adapted to start a device capability (including internal device capability and external device capability). By executing the operation of the Start node, the device management server can start the device capability. It is noted that for some device capabilities, Enable is not equivalent to Start. For example, for the camera capability in a terminal, after the terminal executes an Enable operation, the camera is only in available status, but has not taken an image indeed. To take an image, it is necessary to execute a Start operation. For some device capabilities (e.g. Infrared capability), Enable is equivalent to Start, and in that case, only one of the Enable node or the Start node is necessary to be added under the Operations node.

TABLE 9

<X>/Operation/Stop

| Tree Occurrence | Format | MM. Access Types |
|---|---|---|
| ZeroOrOne | Chr | Get, Exec |

The Stop node is adapted to stop the device capability. By executing the operation of this node, the device management server can stop the device capability. The difference between the Stop and Disable nodes is similar to that between the Start and Enable nodes, and therefore will not be described further.

TABLE 10

<X>/Operation/Update

| Tree Occurrence | Format | Min. Access Types |
|---|---|---|
| ZeroOrOne | Chr | Get, Exec |

The Update node is adapted to update the driver of the device capability.

TABLE 11

<X>/Operation/Remove

| Tree Occurrence | Format | Min. Access Types |
|---|---|---|
| ZeroOrOne | Chr | Get, Exec |

The Remove node is adapted to remove the device capability.

TABLE 12

<X>/Status

| Tree Occurrence | Format | Min. Access Types |
|---|---|---|
| ZeroOrOne | Chr | Get |

Figure 6:
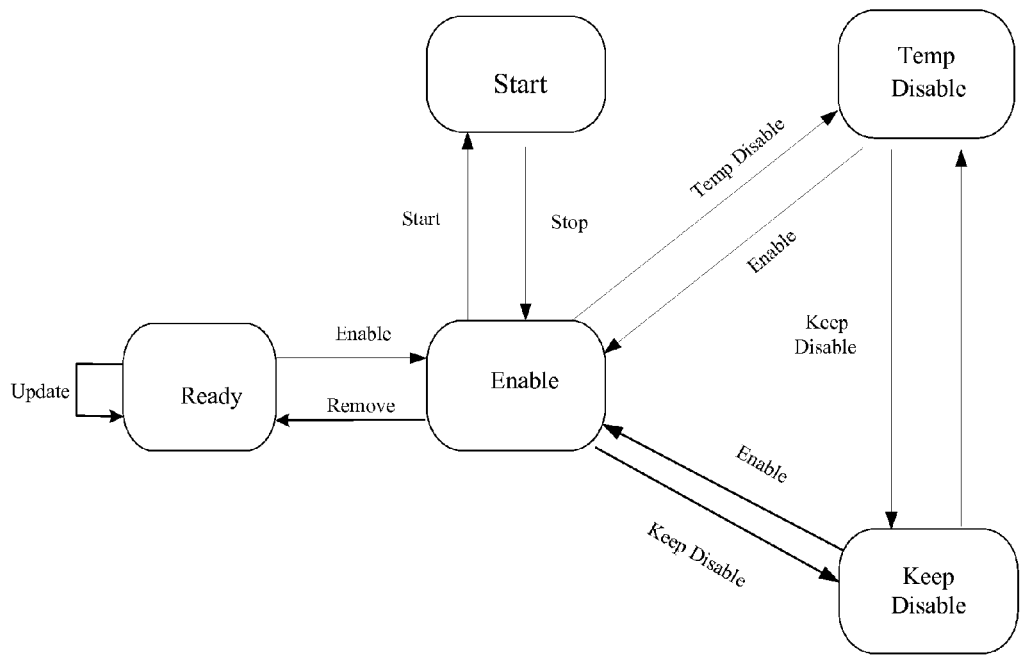
FIG. 6 is a schematic diagram illustrating commands sent from a DM server and status transition of a device capability.

On the device capability management tree, the Status node, which is at the same level as the Operations node, is adapted to store current status of a device capability of the terminal. Possible status types of the terminal device capability include Enable, Temp Disable, Keep Disable, Ready and Start, etc. The relationship between the device capability management operations triggered by operations for a target operation node and the status transition of a device capability is shown in FIG. 6. For management operation commands to the target operation node from the device management server, status types of the terminal device capability mainly include:

Ready status, which indicates that the device capability may be installed on the terminal;

Enable status, which indicates that the device capability is in enabled status;

Temp Disable status, which indicates that the device capability of the terminal is disabled temporarily; the user can enable the device capability by means of an Enable operation; or, which can be changed by means of sending an appropriate management operation (e.g. Enable or Keep Disable) from the device management server;

Keep Disable status, which indicates that the device capability of the terminal is disabled by force; this status can't changed by the user through operating the target operation node in management tree, but can only be changed by the device management server through sending an appropriate management operation (e.g. Enable or Temp Disable); and Start status, which indicates that the device capability of the terminal is started.

Figure 7:
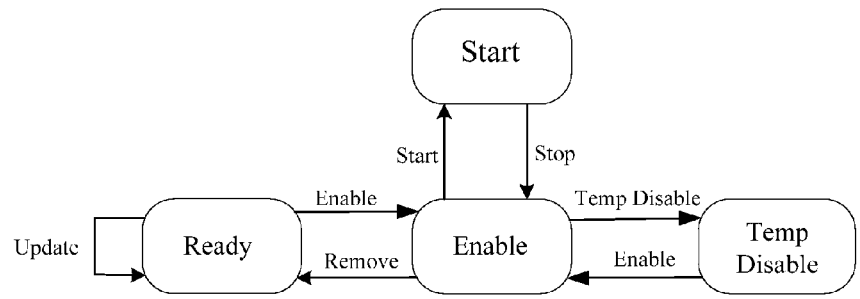
FIG. 7 is a schematic diagram illustrating commands sent from a user and status transition of a device capability.

The user can operate the device capability of the terminal by directly initiating an operation to the device management agent unit via an interactive interface of the terminal or by sending a command to the device management agent via the smart card on the terminal. FIG. 7 shows the commands from the terminal for operating a target operation node of a device capability MO on a management tree and the status transition of the device capability. Compared with FIG. 6, there is no Keep Disable status in the status of the device capability and no Keep Disable operation in the executable operation commands in FIG. 7, because the user is unable to transit the status of the device capability of the terminal to Keep Disable. When the device capability is in Keep Disable status, it is necessary to judge the authority of the user and that of the device management server. The management operations executable for the user are different from those executable for the device management server. When the device capability is in Keep Disable status, the user can't change the status by executing a management operation, in other words, the device management server has a higher device capability management authority than the user.

The operation commands from the device management server and the operation commands from the user are illustrated in the following table. The table shows the management operations available for the device capability of the terminal in different status.

TABLE 13

| Status of device capability | Management operations executable for user | Management Operations Executable for device management Server |
|---|---|---|
| Enable | Temp Disable Start Remove | Temp Disable Keep Disable Start Remove |
| Ready | Enable Update | Enable Update |
| Temp Disable | Enable | Enable Keep Disable |
| Keep Disable |  | Temp Disable Enable |
| Start | Stop | Stop |

Figure 4:
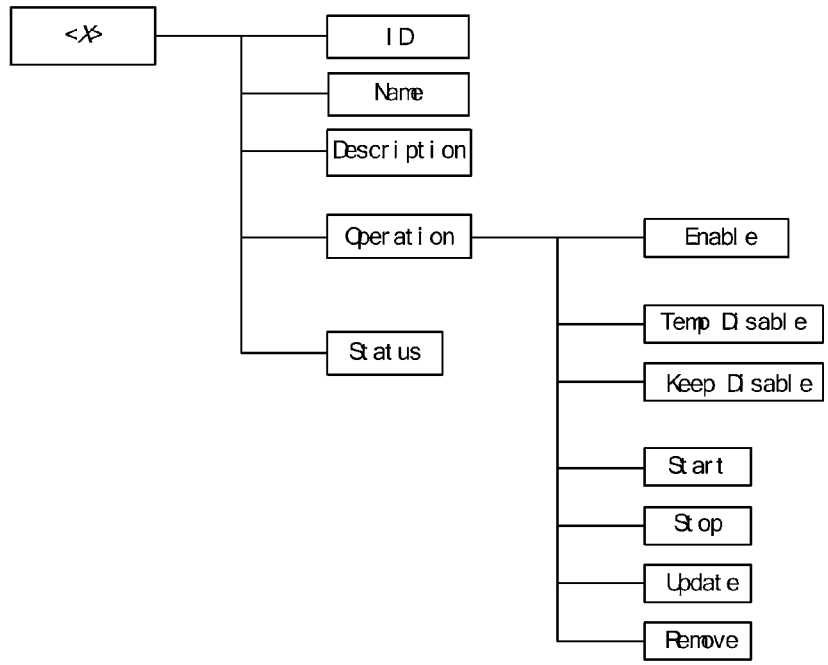
FIG. 4 is a schematic diagram illustrating a second embodiment of the structure of a device capability MO of the present invention.

It is noted that the structure of the device capability MO shown in FIG. 3 is only an example, and in practical applications, the device capability MO structures are not limited to this structure. Device capability MOs in different structures may be defined for terminals with different device capabilities. Another device capability MO structure will be described hereunder. FIG. 4 shows a schematic diagram of a second embodiment of a device capability MO structure of the present invention. The main difference between the device capability MO structure of the second embodiment shown in FIG. 4 and that of the first embodiment shown in FIG. 3 lies in that, in the first embodiment, the two device capability management operations Keep Disable and Temp Disable correspond to the same target operation node (Keep_Temp node), while in the second embodiment, the two device capability management operations correspond to a target operation node respectively, that is, the Keep Disable management operation corresponds to the Keep Disable node and the Temp Disable management operation corresponds to the Temp Disable node.

Moreover, in the second embodiment, the Enable node, the Keep Disable node and the Temp Disable node have no child node (e.g. the ServerID node, Code node and Timeout node as shown in FIG. 3). As mentioned in the description of the structure as shown in FIG. 3, the ServerID node and the Code node are provided to implement the technical solution related to authentication code, and the Timeout node is provided to prevent the device capability from disabled for long in abnormal cases. Therefore, these nodes are optional, and are omitted in the technical solution of the second embodiment as shown in FIG. 4.

Other nodes shown in FIG. 4, such as the Start node, the Stop node, the Update node and the Remove node, are identical to the nodes with the same name as shown in FIG. 3, and thus will not be described further.

Figure 5:
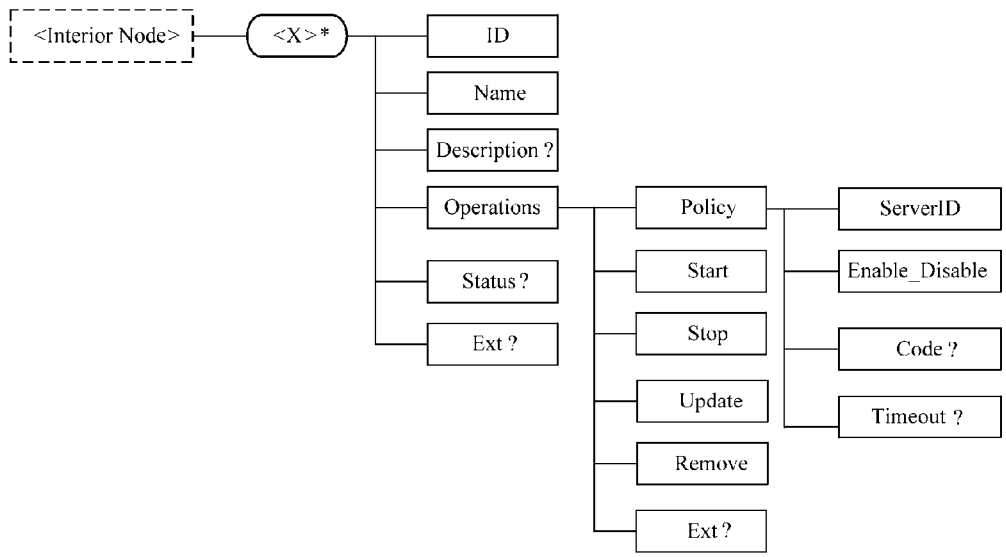
FIG. 5 is a schematic diagram illustrating a third embodiment of the structure of a device capability MO of the present invention.

FIG. 5 shows a schematic diagram of a third embodiment of a device capability MO structure of the present invention.

The main difference between the device capability MO structure of the third embodiment shown in FIG. 5 and the structure of the first embodiment shown in FIG. 3 lies in that, in the third embodiment, the device capability management operations Enable, Keep Disable and Temp Disable correspond to the same target operation node (Enable_Disable). To execute any of the three device capability management operations, the device management server or the user needs to modify the value of the node directly, and different values of the node correspond to different device capability management operations. For example, a value 0 of the Enable_Disable node corresponds to the Enable operation, a value 1 of the Enable_Disable node corresponds to the Temp Disable operation, and a value 2 of the Enable_Disable node corresponds to the Keep Disable operation.

The structure of device capability management object shown in FIG. 5 will be described hereunder in detail.

The child nodes under the Operations node include Policy, Start, Stop, Update and Remove nodes. The child nodes under the Policy node include Enable_Disable, ServerID, Code and Timeout nodes, each of which is a leaf node. These leaf nodes are described as follows.

The Enable_Disable node may correspond to three device capability management operations including Enable, Temp Disable and Keep Disable. The Enable_Disable node may be an indicator node having three values. Different operations for this node (i.e. assigning different values to the node) correspond to different device capability management operations.

The nodes under the Policy node have the data structures as follows.

TABLE 14

| <X>/Operation/Policy/Enable_Disable | | |
| --- | --- | --- |
| Tree Occurrence | Format | Min. Access Types |
| ZeroOrOne | Chr | Get |

TABLE 15

| <X>/Operation/Policy/Code | | |
| --- | --- | --- |
| Tree Occurrence | Format | Min. Access Types |
| ZeroOrOne | Chr | Replace |

The Code node is adapted to authenticate validity of the device capability management operations. An authentication code is written into the Code node by the device management server. Then the authentication code provided by the initiator of a management operation command may be authenticated according to the authentication code in the Code node.

TABLE 16

| <X>/Operation/Policy/ServerID | | |
| --- | --- | --- |
| Tree Occurrence | Format | Min. Access Types |
| ZeroOrOne | Chr | Get |

The ServerID node has the same meaning as that of the ServerID node shown in FIG. 3, and therefore will not be described further.

TABLE 17

| <X>/Operation/Policy/Timeout | | |
| --- | --- | --- |
| Tree Occurrence | Format | Min. Access Types |
| ZeroOrOne | Chr | Get |

The Timeout node has an identical meaning as that of the Timeout node shown in FIG. 3, and therefore will not be described further.

Figure 8:
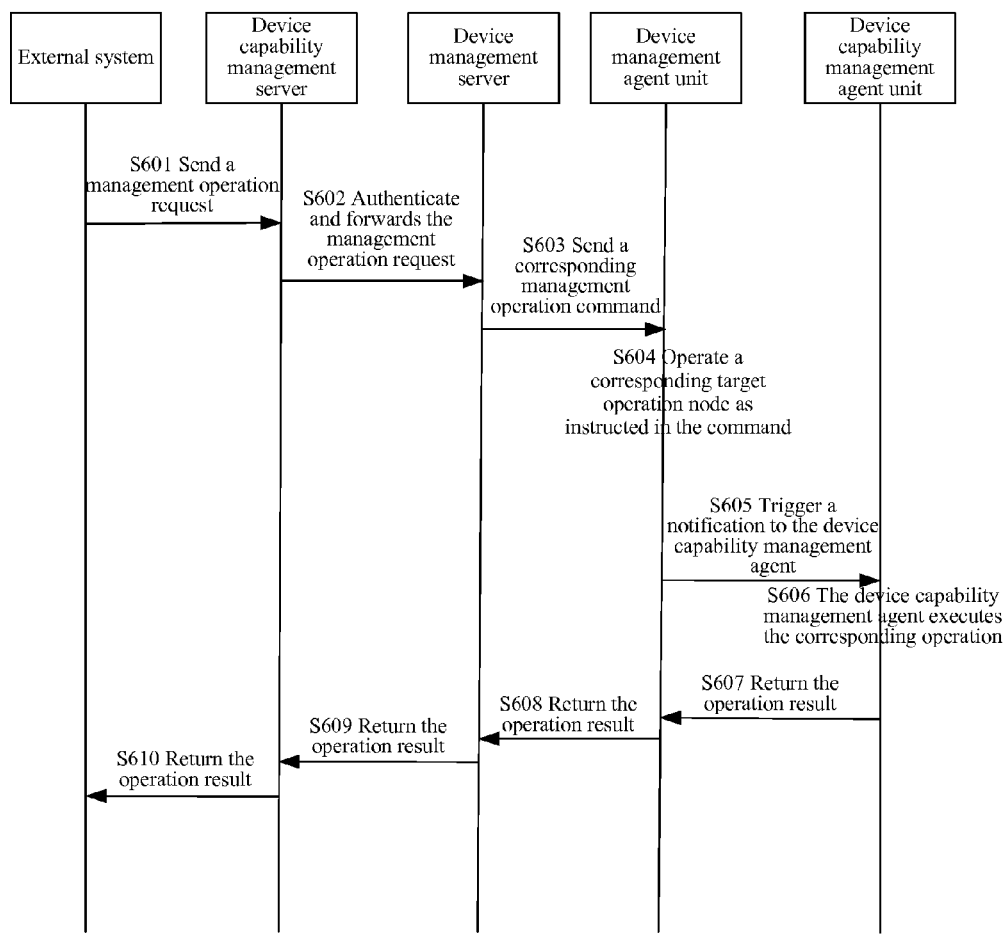
FIG. 8 is a flow chart illustrating an application of a first embodiment of the present invention.

Hereunder an application of a first embodiment of the present invention will be detailed with reference to FIG. 8. This embodiment will be described by example of an operation for the Enable node in the structure of the device capability management object shown in FIG. 3.

In process S601, the external system sends a device capability management operation associated with the Enable node by sending a management operation request to the device capability management server via Web Service Interface (WSI) protocol.

In process S602, the device capability management server authenticates the identity of the external system and verifies the syntax of the relevant management operation, creates a corresponding device capability management operation command according to the management operation request, and then sends the device capability management operation command to the device management server.

In process S603, the device management server sends the device capability management operation commands to a device management agent unit of the terminal. The management operation command is sent by means of operating an executable node on the management tree by the device management server. Specifically, the device management server sends an authentication code for enabling the device capability of the terminal (this procedure is optional) to the terminal, and then executes the Enable node by sending an executable command to the terminal, so as to directly execute the target operation node corresponding to the management operation, for example,

```
<Replace>
    <CmdID>3</CmdID>
    <Item>
        <Target>
            <LocURI>./USB/Operation/Enable/Code</LocURI>
        </Target>
        <Data>!@ewenewpjgen99793-2!@</Data>
    </Item>
</Replace>
<Exec>
    <CmdID>3</CmdID>
    <Item>
        <Target>
            <LocURI>./USB/Operation/Enable</LocURI>
        </Target>
    </Item>
</Exec>
```

It is noted that each device capability (e.g. Camera, Blue Tooth or Infrared) of the terminal corresponds to a set of device capability MOs, and the management operation command indicates a target operation node in a certain device capability management object. Therefore, according to the path information of the target operation node indicated in the management operation command, the terminal can know on which device capability the management operation is to be performed.

In process S604, the device management agent unit operates the node in the device capability MO on the management tree according to the device capability management operation command sent by the device management server, to execute the corresponding target operation node Enable node on the management tree with the command.

In process S605, the device management agent unit operates the target operation node Enable node on the management tree, triggering a notification to instruct the device capability management agent unit to execute the device capability management operation corresponding to the operation for the Enable node.

The path involved in the operating indicates the device capability to be operated.

In process S606, upon receipt of the notification from the device management agent unit, the device capability management agent unit executes the corresponding device capability management operation. In order to ensure the device capability management operation notified by the device management agent unit to be executed is valid, the device capability management agent unit authenticates legality (i.e. validity) of the device capability management operation before executing the device capability management operation. On one hand, the device capability management agent unit authenticates the authentication code provided by the initiator of the management operation command to confirm that the initiator of the management operation command has a sufficient authority; on the other hand, the device capability management agent unit verifies whether the device capability management operation is a valid management operation in the current status of the device capability of the terminal, mainly because only part of management operations may be executed when the device capability of the terminal is in a certain status.

It is noted that the setting of the contents related to the authentication code is to prevent the condition that the device capability is disabled by the device management server for long in abnormal cases. In such an abnormal case, the user can obtain the authentication code from the device management server and then enable the device capability of the terminal. In this way, the technical solution of the embodiment is consummated. If the information indicated in the device capability management operation command received by the terminal is not "Enable," the relevant procedures for authenticating the authentication code are unnecessary.

If it is not necessary to consider the above abnormal condition, i.e. if the device capability of the terminal is currently in Keep Disable status and the user is absolutely forbidden to enable the device capability by himself, it is not necessary to execute the setting and procedures related to the authentication code. In such a case, the terminal determines whether the Enable operation to be executed is valid according to the information about the initiator of the device management operation command. If the terminal identifies that the initiator is a DM server, it determines that the Enable operation is valid and then executes the Enable operation; on the contrary, if the terminal identifies that the initiator is the user, it determines that the Enable operation is invalid and does not execute the Enable operation. Accordingly, it is not necessary to create a Code child node under the Enable node and the Disable node on the management tree of the terminal. When the device capability of the terminal is in Keep Disable status, it is not necessary for the initiator of the Enable management operation command to provide the authentication code and for the device capability management agent unit to execute the procedures for authenticating the authentication code.

In process S607, the device capability management agent unit sends the result of the device capability management operation to the device management agent unit.

In process S608, the device management agent unit sends the result of the device capability management operation to the device management server via the DM protocol.

In process S609, the device management server sends the result of the device capability management operation to the device capability management server.

In process S610, the device capability management server sends the result of the device capability management operation to the external system according to a policy.

The external system performs subsequent operations according to the result of the device capability management operation. The management of the device capability of the terminal is completed.

In the above embodiment, the target operation node may be an executable node or an indicator node. If the target operation node on the device management tree is an indicator node, the device capability management agent unit is usually unable to receive the notification of the device capability management operation from the device management agent unit directly, and thus a third-party monitoring unit is required to monitor the value of the target operation node of the device capability. A change in the value of the target operation node triggers the monitoring unit to instruct the device capability management agent unit to execute a corresponding device capability management operation. The third-party monitoring unit may be implemented with a monitoring program which may be a Scheduling task or a diagnostic and monitoring task.

Figure 9:
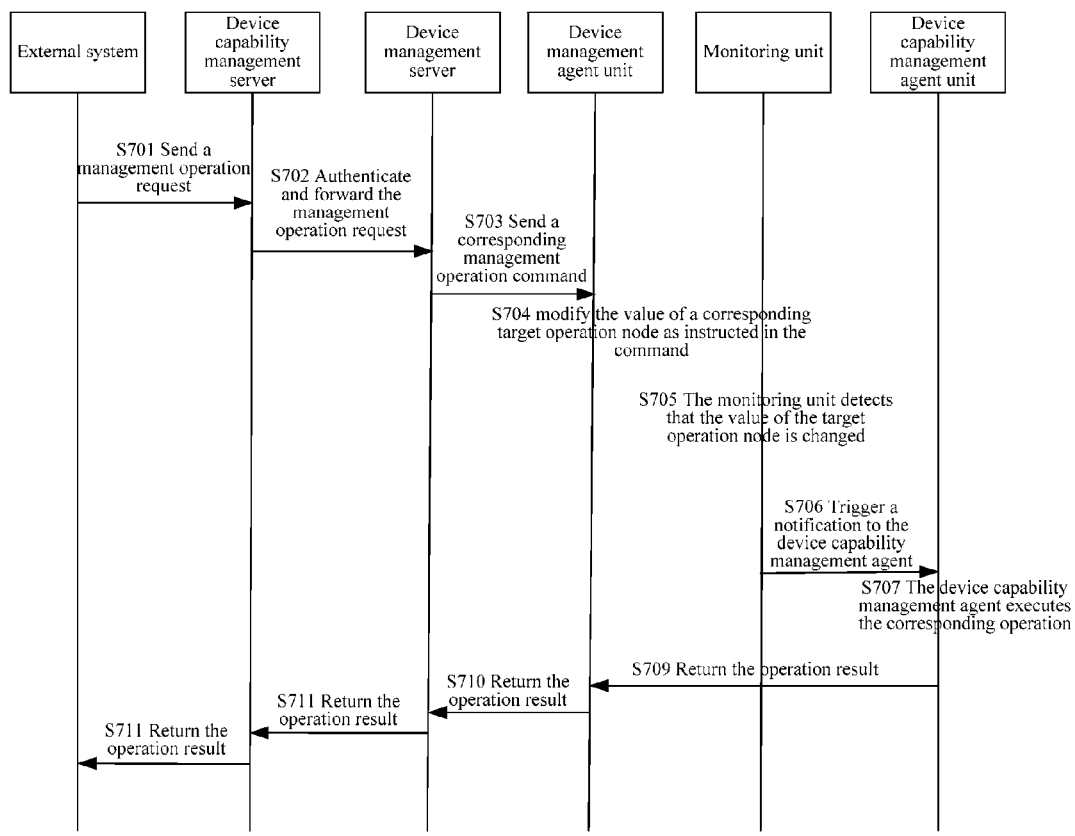
FIG. 9 is a flow chart illustrating an application of a second embodiment of the present invention.

Hereunder a second embodiment of a method of the present invention will be detailed with reference to FIG. 9. This embodiment involves the above monitoring unit.

In process S701, the external system sends a device capability management operation request to the device capability management server via the WSI protocol.

In process S702, the device capability management server authenticates the identity of the external system and verifies the syntax of the relevant management operation, creates a corresponding device capability management operation command according to the management operation request, and then sends the device capability management operation command to the device management server.

In process S703, the device management server sends the device capability management operation command to the device management agent unit. The management operation command is sent by means of operating an indicator node in the device capability MO on the management tree by the DM server. Specifically, the DM server sends an authentication code for enabling the device capability of the terminal to the terminal, and then sends a Replace command to the terminal to modify the value of the target operation node corresponding to the device capability management operation, for example,

```
<Replace>
    <CmdID>3</CmdID>
    <Item>
        <Target>
            <LocURI>./USB/Operation/Enable/Code</LocURI>
        </Target>
        <Data>!@ewenewpjgen99793-2@!</Data>
    </Item>
</Replace>
<Replace>
    <CmdID>3</CmdID>
    <Item>
        <Target>
            <LocURI>./USB/Operation/Enable</LocURI>
            <Value>true</Value>
        </Target>
    </Item>
</Replace>
```

In process S704, the device management agent unit operates the target operation node, i.e. the Enable node on the device capability management tree according to the Enable operation sent from the device management server, to modify the value of the target operation node to be "true".

In process S705, after the value of the Enable node is modified, the monitoring unit detects the change in the value of the Enable node.

In process S706, the monitoring unit sends a notification to the device capability management agent unit to instruct the device capability management agent unit to execute a corresponding device capability management operation.

In process S707, upon receipt of the notification from the monitoring unit, the device capability management agent unit executes the corresponding device capability management operation. Optionally, the device capability management agent unit authenticates validity of the device capability management operation before executing the corresponding device capability management operation. Specifically, the device capability management agent unit authenticates the authentication code provided by the initiator of the management operation and verifies whether the device capability management operation is a valid management operation in the current status of the device capability of the terminal.

In process S708, the device capability management agent unit sends the result of the device capability management operation to the device management agent unit.

In process S709, the device management agent unit sends the result of the device capability management operation to the device management server via the DM protocol.

In process S710, the device management server sends the result of the device capability management operation to the device capability management server.

In process S711, the device capability management server sends the result of the device capability management operation to the external system according to a policy.

The external system performs subsequent operations according to the result of the device capability management operation. The management of the device capability of the terminal is completed.

Hereunder supplemental description is made on the device capability management operation.

For a device capability management operation on the management tree, if the device capability of the terminal is currently in Enable or Start status and the management operation to be executed is a Start or Stop operation for the device capability, the Start or Stop operation will be referred to as a Use operation. The Use operation implements the Start or Stop operation for the device capability driver (i.e. Start or Stop operation for the device capability) by invoking an Application Programming Interface (API) function based on the device capability driver.

To implement the Start or Stop operation for the device capability driver, it is necessary for the Use operation to invoke the API function, so the Use operation is different from other device capability management operations in implementation. Consequently, in the process S606 for the first embodiment of the method inventive and the process S707 for the second embodiment, upon receipt of the device capability management operation, the device capability management agent unit needs to obtain the information on the current status of the device capability of the terminal from the Status node of the device capability MO, and needs to obtain the information on the device capability management operation corresponding to the target operation node from the device management agent unit. If the obtained current status of the device capability is Enable or Start status and the current device capability management operation is Start or Stop (i.e. a Use operation), the device capability management operation needs to be implemented through an API, no matter whether the device capability management operation is from the DM server or from the user.

For some management operations other than the Use operations, which can be executed by the device capability management agent, it is not necessary to use an API to transit the status of the device capability.

Whether for Use operations or non-Use operations, it may be determined according to the current status of the device capability of the terminal and the device capability management operation to be executed (i.e. the device capability management operation corresponding to the operation for the target operation node) whether the device capability management operation can be executed or not (i.e. whether the device capability management operation is a valid one). The procedures for the determination, the execution of the device capability management operation and the transition of the status of the device capability are described as follows.

If the current status of the device capability of the terminal is Start status and the device capability management operation is a Stop operation, it is determined that the device capability management operation is valid, and the device capability management operation is executed (i.e. the device capability is stopped) and the status of the device capability is transited to Enable status.

If the current status of the device capability of the terminal is Start status while the device capability management operation is not a Stop operation, it is determined the device capability management operation is invalid. If the current status of the device capability of the terminal is Enable status, and the device capability management operation is a Start operation, it is determined that the device capability management operation is valid, and the device capability management operation is executed (i.e. the device capability is started) and the status of the device capability is transited to Start status.

If the current status of the device capability of the terminal is Enable status and the device capability management operation is a Temp Disable operation, it is determined that the device capability management operation is valid, and the device capability management operation is executed (i.e. the device capability is disabled temporarily) and the status of the device capability is transited to Temp Disable status.

If the current status of the device capability of the terminal is Enable status and the device capability management operation is a Keep Disable operation, it is determined that the device capability management operation is valid, and the device capability management operation is executed (i.e. the device capability is disabled by force) and the status of the device capability is transited to Keep Disable status.

If the current status of the device capability of the terminal is Enable status and the device capability management operation is a Remove operation, it is determined the device capability management operation is valid, and the device capability management operation is executed (i.e. the device capability of the terminal is removed) and the status of the device capability is transited to Ready status.

If the current status of the device capability of the terminal is Enable status while the device capability management operation is not a Start operation, a Temp Disable operation, a Keep Disable operation or a Remove operation, it is determined that the device capability management operation is invalid.

If the current status of the device capability of the terminal is Temp Disable status and the device capability management operation is an Enable operation, it is determined that the device capability management operation is valid, and the device capability management operation is executed (i.e. the device capability is enabled) and the status of the device capability is transited to Enable status.

If the current status of the device capability of the terminal is Temp Disable status while the device capability management operation is not an Enable operation or a Keep Disable operation, it is determined that the device capability management operation is invalid.

If the current status of the device capability of the terminal is Ready status and the device capability management operation is an Enable operation, it is determined that the device capability management operation is valid, and the device capability management operation is executed (i.e. the device capability is enabled) and the status of the device capability is transited to Enable status.

If the current status of the device capability of the terminal is Ready status and the device capability management operation is an Update operation, it is determined that the device capability management operation is valid, and the device capability management operation is executed (i.e. the driver of the device capability on the terminal is updated) and the status of the device capability is kept in Ready status.

If the status of the device capability of the terminal is Ready status while the device capability management operation is not an Enable or Update operation, it is determined that the device capability management operation is invalid.

The user and the device capability management server have different operation authorities for device capability management operations in certain status. For these operations, it is necessary to determine whether the management operation command corresponding to the device capability management operation is initiated from the user or the device management server. Specifically, whether the device capability management operation is valid needs to be determined according to the current status of the device capability, the device capability management operation to be executed and the information on the initiator of the management operation command. There is no precedence order of judgment among these aspects; the judgment procedures are as follows.

For a technical solution that doesn't involves an authentication code, if the management operation command received by the terminal is from the user (i.e. the user sends the command through the terminal) and the current status of the device capability of the terminal is Keep Disable status, it is determined that the device capability management operation is invalid. For a technical solution that involves an authentication code, if the management operation command is from the user while the authentication code provided by the user is authenticated as valid (i.e. the user has obtained authorization from the device management server with a management authority higher than that of the user), it is determined that the device capability management operation is valid; otherwise, if the authentication code provided by the user is authenticated as invalid, it is determined that the device capability management operation is invalid.

In the case that the management operation command received by the terminal is from a device management server that has a device capability management authority over the terminal, if the current status of the device capability of the terminal is Keep Disable status and the device capability management operation is an Enable operation, the device capability management agent unit is instructed to enable the device capability, and the status of the device capability is transited to Enable status. If the current status of the device capability is Keep Disable status and the device capability management operation is a Temp Disable operation, the device capability management agent unit is instructed to disable the device capability temporarily, and the status of the device capability is transited to Temp Disable status. The above case is mainly applicable to the condition that there is only one device management server having a device capability management authority over the terminal. It is understood that other device capability management servers that have no device capability management authority over the terminal usually generally can't send a correct management operation command to the terminal. Even if the management operation command is correct, the terminal can identify that the device management server has no management authority and thereby determine that the management operation command is invalid.

In practice, there may be more than one device management server that can manage the device capability of the terminal, and only one of the device management servers that has the highest device capability management authority has the authority to enable the device capability of the terminal when the device capability is in Keep Disable status. In this case, the Enable operation corresponding to the management operation command sent from the device management server with the highest device capability management authority is valid (the current status of the device capability is in Keep Disable status), while the Enable operation corresponding to the management operation command sent from other device management server is invalid (the current status of the device capability is in Keep Disable status).

Figure 10:
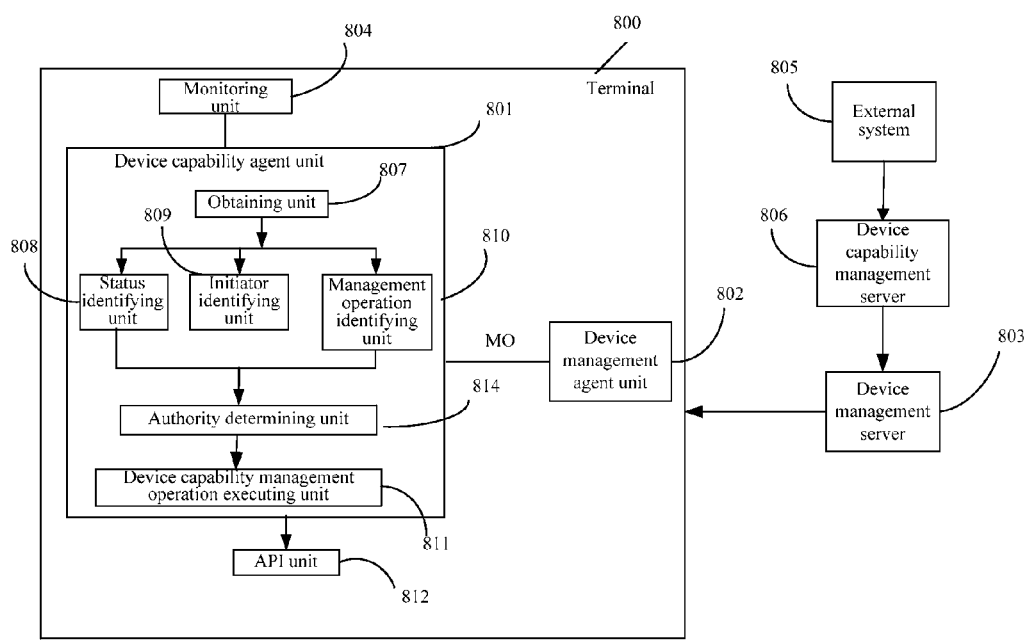
FIG. 10 is a schematic diagram illustrating an embodiment of a system of the present invention.

FIG. 10 shows a schematic diagram of an embodiment of a communication system for implementing terminal management provided in the present invention. The communication system mainly includes a terminal 800 and a device management server 803.

The device management server 803 is adapted to send a management operation command to the terminal 800 (specifically, a device management agent unit 802). The management operation command contains instruction information that instructs the terminal to operate the target operation node in the device capability management object, e.g. information indicating the name of the target operation node. If the target operation node on the terminal management tree is an indicator node, the instruction information may contain the value to be changed to for the target operation node.

The terminal 800 further includes the device management agent unit 802 and a device capability management agent unit 801. The device management agent unit 802 is adapted to operate the target operation node in the device capability MO as indicated in the received: management operation command. The device capability management agent unit 801 is adapted to execute a device capability management operation corresponding to the operation for the target operation node performed by the device management agent unit 802. The device capability management operation is adapted to transit the status of the device capability.

The target operation node in this embodiment may be an executable node. The operation for the target operation node performed by the device management agent unit 802 may be executing the target operation node directly. The operation for the target operation node triggers the device management agent unit 802 to instruct the device capability management agent unit 801 to execute the corresponding device capability management operation. The target operation node may also be an indicator node, and the operation for the target operation node performed by the device management agent unit 802 may be modifying the value of the target operation node. If the target operation node is an indicator node, the terminal 800 further includes a monitoring unit 804. The monitoring unit 804 is adapted to monitor the value of the target operation node in the device capability management object. Upon detection of a change in the value of the target operation node, the monitoring unit 804 instructs the device capability management agent unit to execute the corresponding device capability management operation.

In an embodiment of the present invention, the communication system further includes an external system 805 and a device capability management server 806. The external system 805 is adapted to send a device capability management operation request to the device capability management server 806. The device capability management server 806 receives the device capability management operation request from the external system 805, generates, corresponding to the device capability management operation request, a management operation command for operating the target operation node, and sends the management operation command to the device management server 803. In addition, the device capability management server 806 is also adapted to authenticate the identity of the external system 805.

It is noted that the device capability management server 806 may be integrated into the device management server 803, so that the device management server 803 authenticates the identity of the external system 805, receives the device capability management operation request from the external system 805, generates the corresponding device capability management operation command, and sends the generated corresponding device capability management operation command to the terminal 800.

The device capability management agent unit 801 in the terminal 800 executes the corresponding device capability management operation, and forwards the operation result to the device management server 803 via the device management agent unit 802. Then the device management server 803 forwards the operation result to the external system 805 via the device capability management server 806.

The structure of the device capability management agent unit 801 in the terminal 800 will be detailed hereunder. The device capability management agent unit 801 executes a device capability management operation which may be an Update, Remove, Start, Enable, Stop, Temp Disable or Keep Disable operation. The device capability management agent unit 801 transits the status of a device capability to Ready status, Start status, Enable status, Temp Disable status or Keep Disable status by means of the device capability management operation. The relationship between the device capability management operations and status transition has been described in detail previously, and therefore will not be described further.

The device capability management agent unit 801 includes a validity determining unit and a device capability management operation executing unit. The validity determining unit is adapted to determine whether the device capability management operation corresponding to the operation for the target operation node performed by the device management agent unit 802 is valid. The device capability management operation executing unit is adapted to execute the device capability management operation if the validity determining unit determines that the device capability management operation is valid.

The validity determining unit includes an obtaining unit 807, a status identifying unit 808, an initiator identifying unit 809, a management operation identifying unit 810 and an authority determining unit 814.

The obtaining unit 807 is adapted to obtain information on the current status of the device capability, information on the initiator of the management operation command and information on the device capability management operation corresponding to the operation for the target operation node performed by the device management agent unit.

The status identifying unit 808 is adapted to identify the current status of the device capability from the information on the current status of the device capability provided from the obtaining unit 807, and send the identified current status of the device capability to the authority determining unit 814.

The initiator identifying unit 809 is adapted to identify whether the initiator is the device management server 803 or the user from the information on the initiator of the management operation command provided from the obtaining unit 807, and send the identification result to the authority determining unit 814.

The management operation identifying unit 810 is adapted to identify the device capability management operation corresponding to the operation for the target operation node performed by the device management agent unit 802 from the information on device capability management operation provided from the obtaining unit 807, and send the identification result to the authority determining unit 814.

The authority determining unit 814 is adapted to determine whether the device capability management operation corresponding to the operation for the target operation node performed by the device management agent unit 802 is valid according to the obtained determining condition. The determining condition includes the information provided from the status identifying unit 808, the initiator identifying unit 809 and the management operation identifying unit 810. If determining that the device capability management operation to be executed (i.e. the device capability management operation corresponding to the operation for the target operation node performed by the device management agent unit 802) is valid according to the determining condition, the authority determining unit 814 will notify the device capability management operation executing unit 811. The device capability management operation executing unit 811 is adapted to execute the device capability management operation if the authority determining unit 814 determines that the device capability management operation is valid.

The determination by the authority determining unit 814, the operation execution by the device capability management operation executing unit 811 and the transition of the device capability status are described as follows.

If the device capability management operation is a Start operation and the current status of the device capability is Enable status, the authority determining unit 814 instructs the device capability management operation executing unit 811 to execute the Start operation and the status of the device capability is transited to Start status. If the device capability management operation is a Stop operation and the current status of the device capability is Start status, the authority determining unit 814 instructs the device capability management operation executing unit 811 to execute the Stop operation and the status of the device capability is transited to Stop status. Additionally, the terminal 800 further includes an API unit 812. The API unit 812 is adapted to transit the status of the device capability by means of an Application Programming Interface (API) function upon receipt of the Start or Stop operation from the device capability management operation executing unit 811.

If the current status of the device capability is Enable status and the device capability management operation is a Temp Disable operation, the authority determining unit 814 instructs the device capability management operation executing unit 811 to disable the device capability temporarily and the status of the device capability is transited to Temp Disable status.

If the current status of the device capability is Enable status and the device capability management operation is a Remove operation, the authority determining unit 814 instructs the device capability management operation executing unit 811 to remove the driver of the device capability and the status of the device capability is transited to Ready status.

If the current status of the device capability is Temp Disable status and the device capability management operation is an Enable operation, the authority determining unit 814 instructs the device capability management operation executing unit 811 to enable the device capability and the status of the device capability is transited to Enable status.

If the current status of the device capability is Ready status and the device capability management operation is an Enable operation, the authority determining unit 814 instructs the device capability management operation executing unit 811 to enable the device capability and the status of the device capability is transited to Enable status.

If the current status of the device capability is Ready status and the device capability management operation is an Update operation, the authority determining unit 814 instructs the device capability management operation executing unit 811 to update the driver of the device capability and the status of the device capability is kept in Ready status.

If the management operation command corresponding to the device capability management operation is from the user and the current status of the device capability is Keep Disable status, the authority determining unit 814 notifies the device capability management operation executing unit 811 that the device capability management operation is invalid.

If the management operation command corresponding to the device capability management operation is from the device management server 803, the status of the device capability is Keep Disable status and the device capability management operation is Enable operation, then the authority determining unit 814 instructs the device capability management operation executing unit 811 to enable the device capability and the status of the device capability is transited to Enable status.

The validity determining unit described above is mainly used for the technical solution in which it is unnecessary to consider the condition that the device capability of the terminal is kept disabled for long in abnormal cases. In a technical solution in which authentication of authentication code is provided against the abnormal condition, the validity determining unit in the device capability management agent unit 801 determines whether the authentication code provided by the initiator of the management operation command is valid according to the authentication code stored on the terminal, and authenticates validity of the device capability management operation to be executed according to the current status of the device capability. If the current status of the device capability is Keep Disable status, the device capability management operation to be executed is an Enable operation or a Temp. Disable operation, and the authentication code provided by the initiator of the management operation command (who is the device management server 803 or the user) is authenticated as valid, then the validity determining unit determines the device capability management operation as valid and instruct the device capability management operation executing unit 811 to execute the corresponding operation.

The present invention also discloses a terminal for executing a management operation. An embodiment of the structure of the terminal is identical to that of the terminal 800 in the embodiment of the communication system as described above, and therefore will not be described further.

Any modification, equivalent replacement or improvement to the method or terminal system provided in the embodiments without departing from the spirit and principle of the present invention should fall into the protected scope of the present invention.

The invention claimed is:

1. A method for a terminal to execute a management operation in a communication system which employs an Open Mobile Alliance (OMA) device management solution, comprising:

operating, by the terminal, a target operation node in a device capability management object as instructed in a management operation command received by the terminal; wherein the terminal provides a device management tree, and the device capability management object is organized on the device management tree as a node, and triggering, by operation of the target operation node, execution of a corresponding device capability management operation;

determining that the device capability management operation is valid, wherein the process of determining that the device capability management operation is valid comprises:

determining that the device capability management operation is applicable to a current status of a device capability of the terminal, and determining that an initiator of the management operation command has an authority to transit the current status of the device capability;

and transiting, by the device capability management operation, a status of the device capability of the terminal from the current status to a target status indicated in the device capability management operation, wherein the initiator of the management operation command is determined to be a device management server, which has the authority, or a user of the terminal, which has the authority issued by the device management server;

the device capability management operation is to enable the device capability of the terminal; and the current status of the device capability of the terminal is disable or kept disable, which is applicable according to the device capability management operation;

if the device capability management operation is determined to be valid, the method further comprises:

transiting, by the device capability management operation, the status of the device capability of the terminal from disable to enable.

2. The method according to claim 1, wherein the management operation command received by the terminal is from a device management server with a device management authority higher than a device management authority of a user of the terminal.

3. The method according to claim 1, wherein the target operation node is an executable node and the operation of the target operation node is to execute contents of the target operation node; or the target operation node is an indicator node and the operation of the target operation node is to modify the value of the target operation node as instructed in the management operation command.

4. The method according to claim 1, wherein the method further comprises:

determining that the initiator of the management operation command has no authority or the current status of the terminal is not applicable according to the device capability management operation, determining that the device capability management operation is invalid; and transiting, by the device capability management operation, the status of a device capability of the terminal occurs only when the device capability management operation is determined as valid.

5. The method according to claim 4, wherein the initiator of the management operation command is determined to be a user of the terminal, which has no authority;

the device capability management operation is determined to be invalid.

6. The method according to claim 4, wherein the current status of the device capability of the terminal is Disable, and the device capability management operation is to disable the device capability of the terminal, or the current status of the device capability of the terminal is Enable, and the device capability management operation is to enable the device capability of the terminal.

* * * * *